United States Patent
Nishizawa

(10) Patent No.: US 11,565,274 B2
(45) Date of Patent: Jan. 31, 2023

(54) MAGNETIC SEPARATOR, MAGNETIC SEPARATOR CONTROL DEVICE, AND MAGNETIC SLUDGE REMOVAL METHOD

(71) Applicant: SUMITOMO HEAVY INDUSTRIES FINETECH, LTD., Okayama (JP)

(72) Inventor: Shinya Nishizawa, Okayama (JP)

(73) Assignee: SUMITOMO HEAVY INDUSTRIES FINETECH, LTD., Okayama (JP)

( * ) Notice: Subject to any disclaimer, the term of this patent is extended or adjusted under 35 U.S.C. 154(b) by 0 days.

(21) Appl. No.: 16/952,672

(22) Filed: Nov. 19, 2020

(65) Prior Publication Data

US 2021/0146377 A1    May 20, 2021

(30) Foreign Application Priority Data

Nov. 20, 2019    (JP) ............................. JP2019-209670

(51) Int. Cl.
| | | |
|---|---|---|
| *B03C 1/033* | (2006.01) | |
| *B03C 1/14* | (2006.01) | |
| *B03C 1/02* | (2006.01) | |

(52) U.S. Cl.
CPC ................. *B03C 1/14* (2013.01); *B03C 1/02* (2013.01); *B03C 1/0332* (2013.01); *B03C 2201/18* (2013.01); *B03C 2201/24* (2013.01)

(58) Field of Classification Search
None
See application file for complete search history.

(56) References Cited

U.S. PATENT DOCUMENTS 3,017,031 A  * 1/1962 Fowler .................... B03C 1/14
                                                            210/222
4,031,004 A    6/1977 Sommer, Jr. et al.
8,505,734 B1   8/2013 Wise
(Continued)

FOREIGN PATENT DOCUMENTS

| EP | 0 541 403 A2 | 5/1993 |
|---|---|---|
| JP | H09-001176 A | 1/1997 |
| JP | 2018-089560 A | 6/2018 |

OTHER PUBLICATIONS

Search Report issued in European Application No. 20204293.3-1203, dated Mar. 23, 2021.

*Primary Examiner* — Bradley R Spies
(74) *Attorney, Agent, or Firm* — Michael Best & Friedrich LLP

(57) ABSTRACT

Provided is a magnetic separator in which even when content of a magnetic sludge in a liquid to be treated increases, recovery performance of the magnetic sludge is less likely to degrade and a malfunction of the device is less likely to occur. A part of an outer peripheral surface of a magnet drum is immersed in a flow of the liquid to be treated containing the magnetic sludge. A removing mechanism removes the magnetic sludge on the outer peripheral surface of the magnet drum from the outer peripheral surface of the magnet drum. A magnetic sludge containing information acquisition device acquires magnetic sludge containing information relating to a content of the magnetic sludge contained in the liquid to be treated. A control device changes a magnetic sludge removal capability of the magnet drum depending on the magnetic sludge containing information acquired by the magnetic sludge containing information acquisition device.

15 Claims, 8 Drawing Sheets

(56) References Cited

U.S. PATENT DOCUMENTS

2014/0083920 A1* 3/2014 Nishizawa ............... B03C 1/02
210/223
2016/0332168 A1 11/2016 Peterson et al.

* cited by examiner

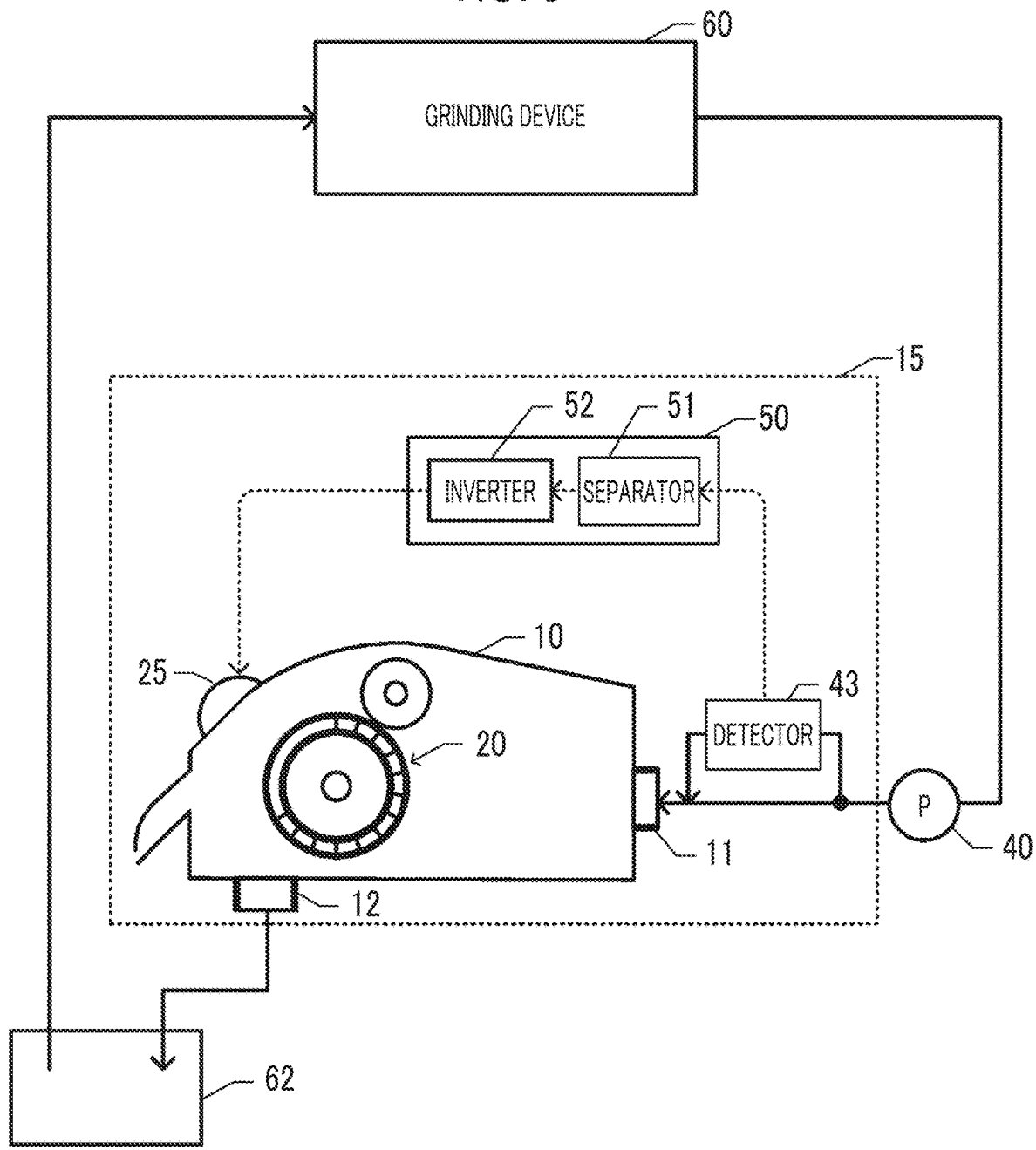

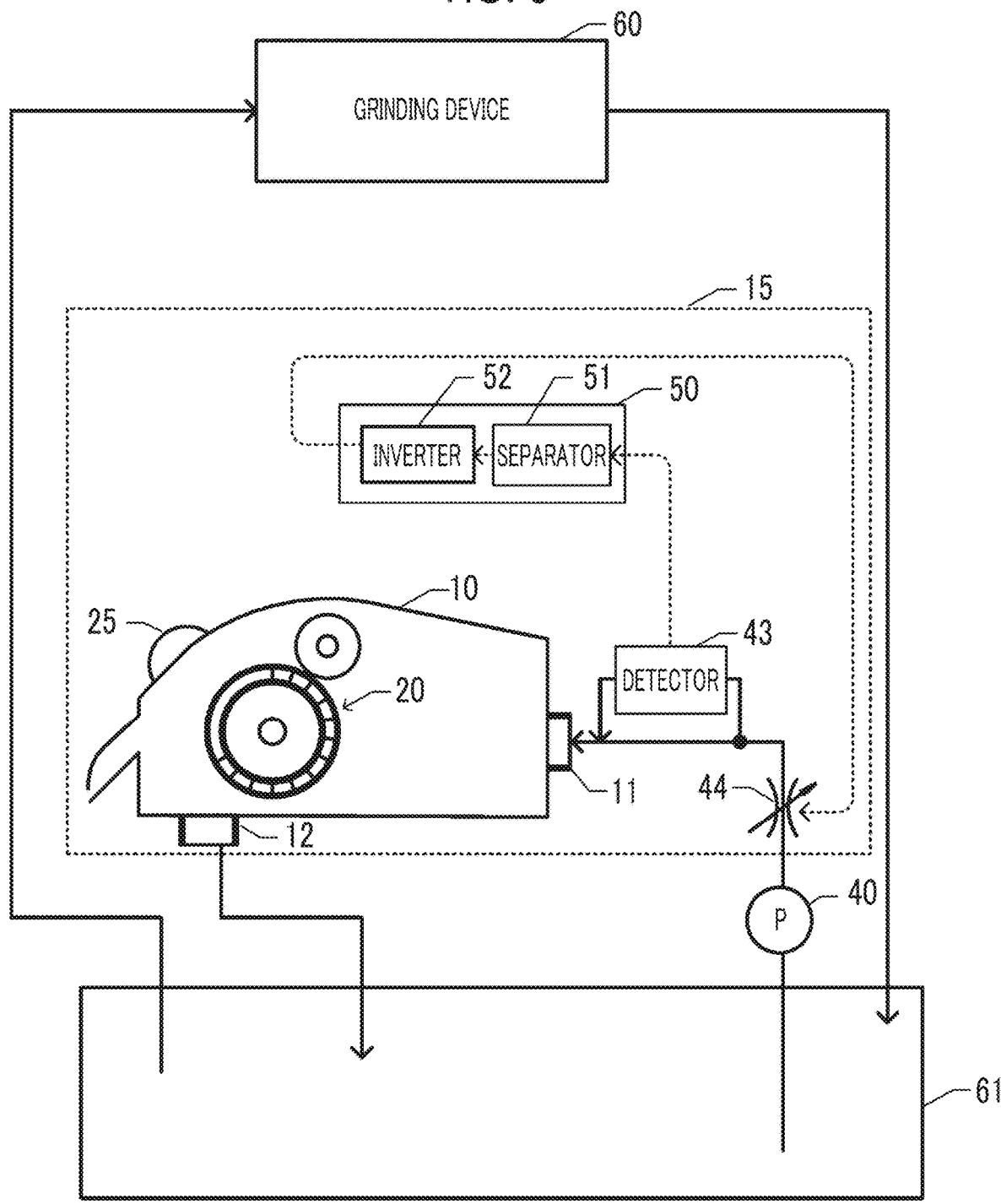

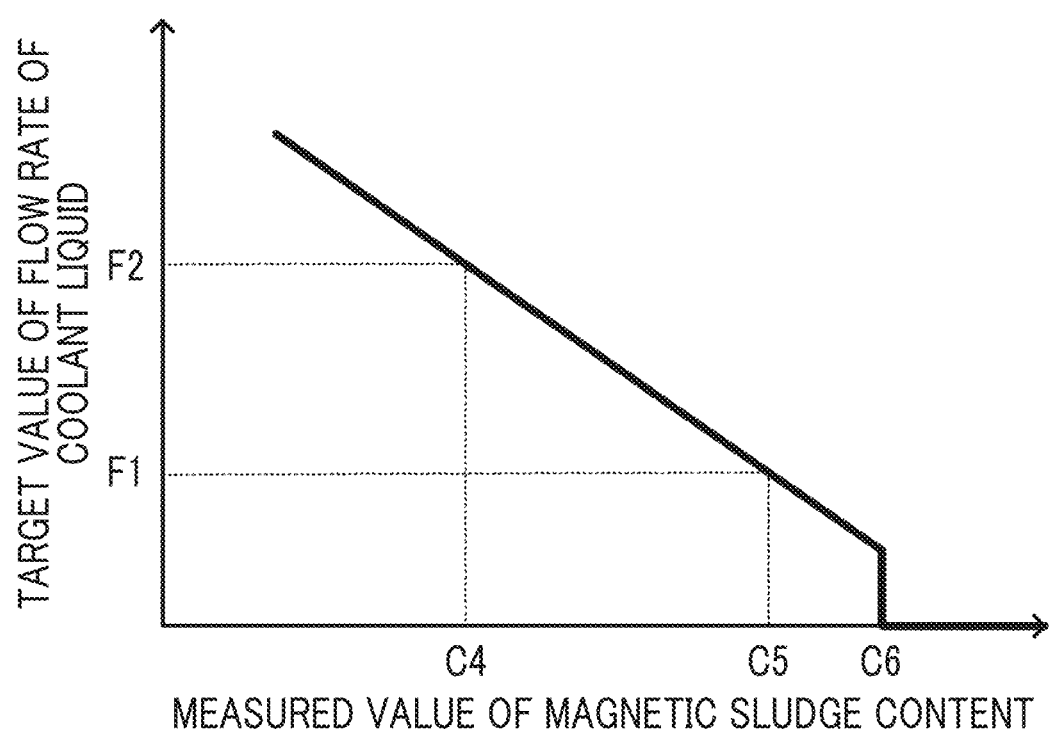

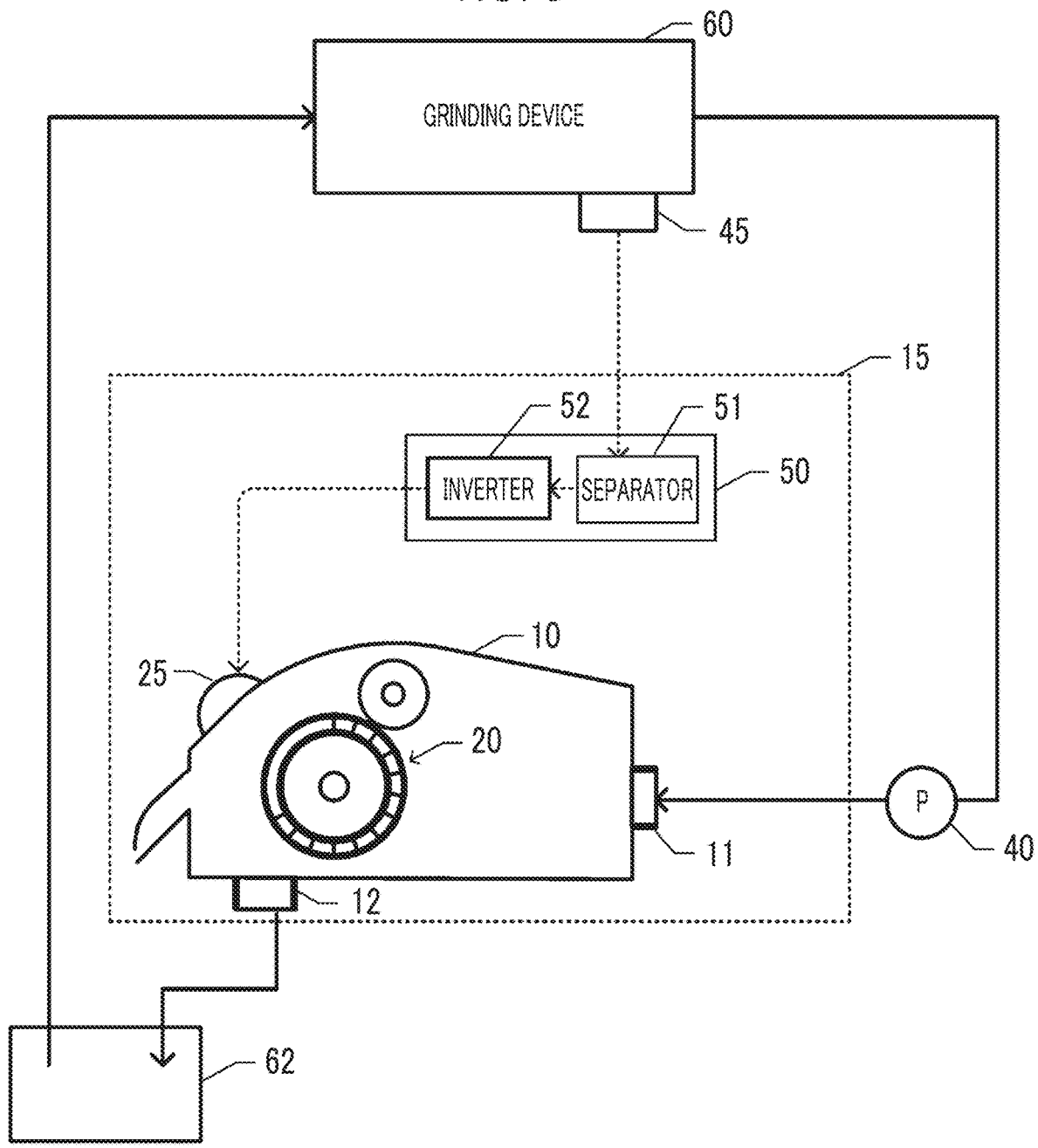

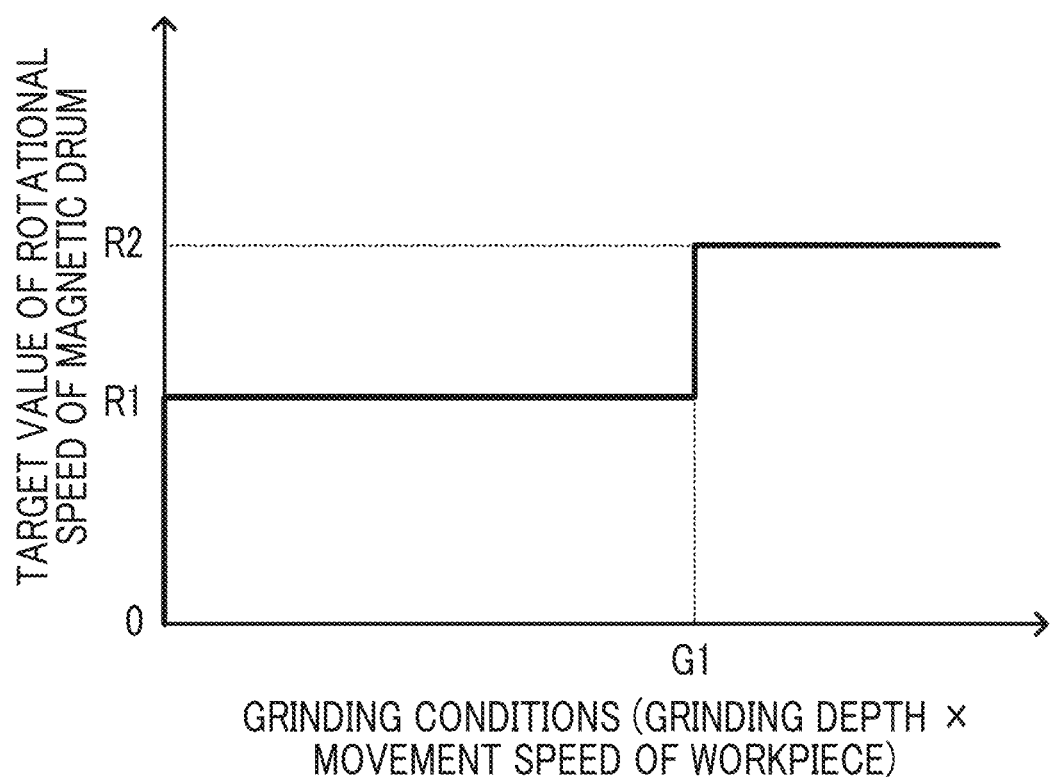

MAGNETIC SEPARATOR, MAGNETIC SEPARATOR CONTROL DEVICE, AND MAGNETIC SLUDGE REMOVAL METHOD

RELATED APPLICATIONS

The content of Japanese Patent Application No. 2019-209670, on the basis of which priority benefits are claimed in an accompanying application data sheet, is in its entirety incorporated herein by reference.

BACKGROUND

Technical Field

Certain embodiments of the present invention relate to a magnetic separator, a magnetic separator control device, and a magnetic sludge removal method.

Description of Related Art

Magnetic separators are known as devices that remove a magnetic sludge from a liquid to be treated containing the magnetic sludge (The related art). In the magnetic separators, a part of a rotating magnet drum is immersed in the liquid to be treated, and the magnetic sludge in the liquid to be treated is attracted to an outer peripheral surface of the magnet drum by a magnetic force. The magnetic sludge attracted on the outer peripheral surface is separated from the liquid to be treated as the magnet drum rotates. The magnetic sludge attracted on the outer peripheral surface of the magnet drum is separated from the liquid to be treated, and then scraped off from the outer peripheral surface of the magnet drum by a scraper or the like and discharged to the outside.

SUMMARY

According to one aspect of the present invention, there is a provided a magnetic separator including:
a magnet drum that rotates in a state in which a part of an outer peripheral surface is immersed in a flow of a liquid to be treated containing a magnetic sludge and a magnetic force is generated on the outer peripheral surface;
a removing mechanism that removes the magnetic sludge on the outer peripheral surface of the magnet drum from the outer peripheral surface of the magnet drum;
a magnetic sludge containing information acquisition device that acquires magnetic sludge containing information relating to a content of the magnetic sludge contained in the liquid to be treated; and
a control device that changes a magnetic sludge removal capability of the magnet drum depending on the magnetic sludge containing information acquired by the magnetic sludge containing information acquisition device.

According to another aspect of the present invention, there is provided a magnetic separator control device that
acquires magnetic sludge containing information related to a content of a magnetic sludge contained in a liquid to be treated flowing into a magnetic separator and
changes a magnetic sludge removal capability of the magnetic separator depending on the acquired magnetic sludge containing information.

According to still another aspect of the present invention, there is provided a magnetic sludge removal method including:
acquiring magnetic sludge containing information related to a content of a magnetic sludge contained in a liquid to be treated flowing into a magnetic separator and
changing a magnetic sludge removal capability of the magnetic separator depending on the acquired magnetic sludge containing information.

BRIEF DESCRIPTION OF THE DRAWINGS

FIG. 5 is a schematic view of a grinding system according to still another embodiment.

FIG. 6 is a schematic view of a magnetic separator according to still another embodiment, and a grinding device.

FIG. 7 is a graph illustrating a relationship between a measured value of the magnetic sludge content of a coolant liquid and a target value of the flow rate of the coolant liquid.

FIG. 8 is a schematic view of a magnetic separator according to still another embodiment, and the grinding device.

FIG. 9 is a graph illustrating an example of a relationship between the grinding conditions and the target value of the rotational speed of the magnet drum.

DETAILED DESCRIPTION

When the content of the magnetic sludge contained in the liquid to be treated increases, there is a case where the recovery performance of the magnetic sludge degrades or a malfunction of the device caused by the attraction of a large amount of magnetic sludge on the magnet drum occurs. It is desirable to provide a magnetic separator in which even when the content of a magnetic sludge in a liquid to be treated increases or decreases, the recovery performance of the magnetic sludge is less likely to degrade and a malfunction of the device is less likely to occur. It is desirable to provide a magnetic separator control device that controls the magnetic separator. It is desirable to provide a magnetic sludge removal method in which even when the content of the magnetic sludge in the liquid to be treated increases or decreases, the recovery performance of the magnetic sludge is less likely to degrade and a malfunction of the device is less likely to occur.

By changing the magnetic sludge removal capability of the magnet drum depending on the c magnetic sludge containing information, it is possible to suppress a decrease in the recovery performance of the magnetic sludge. When the removal capability is enhanced as the magnetic sludge content increases, the malfunction of the device is less likely to occur due to the attraction of a large amount of magnetic sludge to the magnet drum.

A magnetic separator according to an embodiment will be described with reference to FIGS. 1 to 3.

Figure 1:
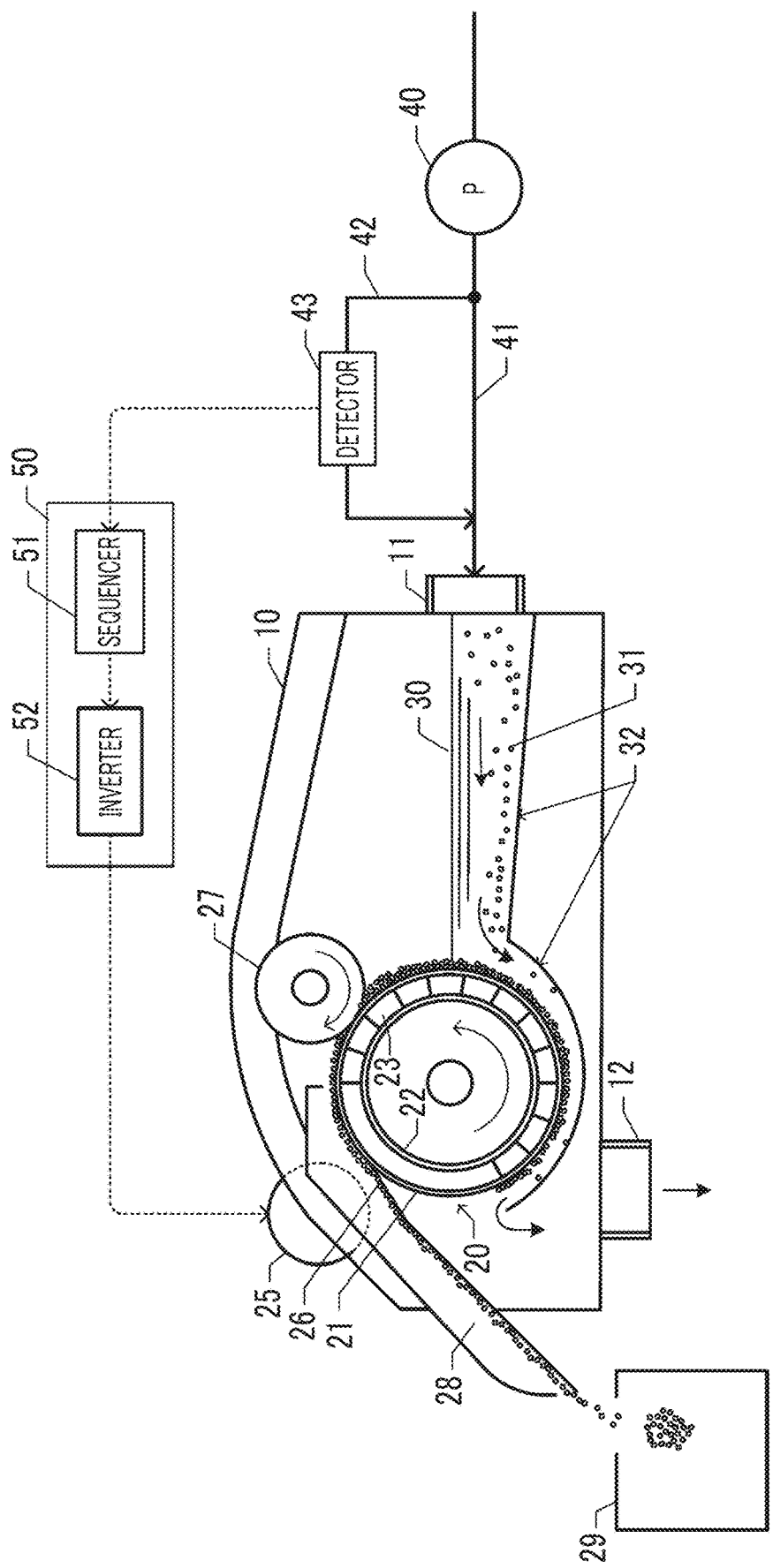
FIG. 1 is a schematic view of a magnetic separator according to an embodiment.

FIG. 1 is a schematic view of the magnetic separator according to the embodiment. A flow path 32 through which a liquid to be treated 30 containing a magnetic sludge 31 flows is defined in a housing 10. The housing 10 includes an inflow port 11 into which the liquid to be treated 30 flows, and a discharge port 12 from which the liquid to be treated 30 is discharged. The magnet drum 20 is disposed in the housing 10. When the liquid to be treated 30 reaches a downstream end of the flow path 32, the liquid to be treated is discharged to the outside from the discharge port 12.

The magnet drum 20 has a central axis parallel to the liquid surface of the liquid to be treated 30 and is supported in the housing 10 in a posture orthogonal to a flow direction of the liquid to be treated 30. The magnet drum 20 has an outer cylinder 21 and an inner cylinder 22. A portion of an outer peripheral surface of the outer cylinder 21 in a circumferential direction, for example, a substantially lower half circumference is immersed in the liquid to be treated 30. The outer cylinder 21 is rotated around the central axis by a motor 25. A driving force is transmitted from the motor 25 to the outer cylinder 21 by, for example, a sprocket and a chain. A movement direction (peripheral speed direction) of the outer peripheral surface of the outer cylinder 21 is opposite to the flow direction of the liquid to be treated 30.

The inner cylinder 22 is fixed to the housing 10 and does not rotate, and a plurality of magnets 23 are disposed side by side in the circumferential direction on an outer peripheral surface of the inner cylinder 22. Each of the magnets 23 is disposed such that magnetic poles having different polarities appear on a surface on an inner peripheral side thereof and a surface on an outer peripheral side thereof and S poles and N poles appear alternately in the circumferential direction. Additionally, the magnet 23 is disposed in a region immersed in the liquid to be treated 30 and a region ranging from the immersed region to a top portion of the inner cylinder 22 in the peripheral speed direction of the outer peripheral surface of the outer cylinder 21 in the circumferential direction. The plurality of magnets 23 generate magnetic flux on the outer peripheral surface of the outer cylinder 21. Due to this magnetic flux, the magnetic sludge 31 is attracted to the outer peripheral surface of the outer cylinder 21.

A part of the bottom surface of the flow path 32 of the liquid to be treated 30 has a shape that reflects the outer peripheral surface of the outer cylinder 21 such that the radial dimension from the outer peripheral surface of the outer cylinder 21 to a bottom surface of the flow path 32 falls within a predetermined range. When the liquid to be treated 30 flows in the vicinity of the outer peripheral surface of the outer cylinder 21, the magnetic sludge 31 is attracted to the outer peripheral surface of the outer cylinder 21 by the magnetic force of the magnet 23. The attracted magnetic sludge 31 moves with the rotation of the outer cylinder 21 and is separated from the liquid to be treated 30 by moving above the liquid surface of the liquid to be treated 30.

A scraper 26 is in contact with an outer peripheral surface of the magnet drum 20 at a position advanced about ⅛ lap in the peripheral speed direction from the top portion of the magnet drum 20. The magnet 23 is not disposed at the point of the outer peripheral surface of the magnet drum 20 where the scraper 26 is in contact. The scraper 26 functions as a removing mechanism for scraping the magnetic sludge 31 on the outer peripheral surface of the magnet drum 20 from the outer peripheral surface. The magnetic sludge 31 scraped off by the scraper 26 is recovered in a recovery container 29 through the discharge path 28.

A roller 27 is pressed against the outer peripheral surface of the magnet drum 20 at a position from a contact point between the outer peripheral surface of the magnet drum 20 and the liquid surface of the liquid to be treated 30 to the top portion of the outer peripheral surface in the peripheral speed direction. The roller 27 rotates in a direction opposite to a rotational direction of the outer cylinder 21 by transmitting power from a rotary shaft of the outer cylinder 21 via the sprocket and the chain. An elastic body is disposed on an outer peripheral surface of the roller 27. When the magnetic sludge 31 attracted on the outer peripheral surface of the magnet drum 20 passes between the outer cylinder 21 and the roller 27, a liquid component adhering to the outer peripheral surface of the outer cylinder 21 is removed. Accordingly, the magnetic sludge 31 having a low liquid component can be separated and recovered.

A pump 40 sends the liquid to be treated 30 containing the magnetic sludge 31 to the inflow port 11 of the housing 10. A branch flow path 42 branches from a main flow path 41 ranging from the pump 40 to the inflow port 11 and then joins the main flow path 41. A detector 43 is inserted in the branch flow path 42. The detector 43 measures the content of the magnetic sludge 31 contained in the liquid to be treated 30 flowing through the branch flow path 42. As the detector 43, for example, a suspended substance concentration meter using a laser can be used. The detector 43 can measure the weight concentration, volume concentration, number of particles per unit volume, or the like of the magnetic sludge as the "magnetic sludge content". The content of the magnetic sludge 31 of the liquid to be treated 30 flowing through the main flow path 41 is substantially the same as the content of the magnetic sludge 31 of the liquid to be treated 30 flowing through the branch flowpath 42. The detector 43 functions as a "magnetic sludge containing information acquisition device" that measures the magnetic sludge content of the liquid to be treated 30.

A measured value of the content of the magnetic sludge 31 is input to the control device 50. The control device 50 includes a sequencer 51 and an inverter 52. The sequencer 51 controls the inverter 52 such that the magnet drum 20 rotates at a preferable rotational speed according to the measured value of the content of the magnetic sludge 31. The inverter 52 supplies driving power to the motor 25. That is, the control device 50 controls the rotational speed of the magnet drum 20 depending on the content of the magnetic sludge 31 contained in the liquid to be treated 30.

Figure 2:
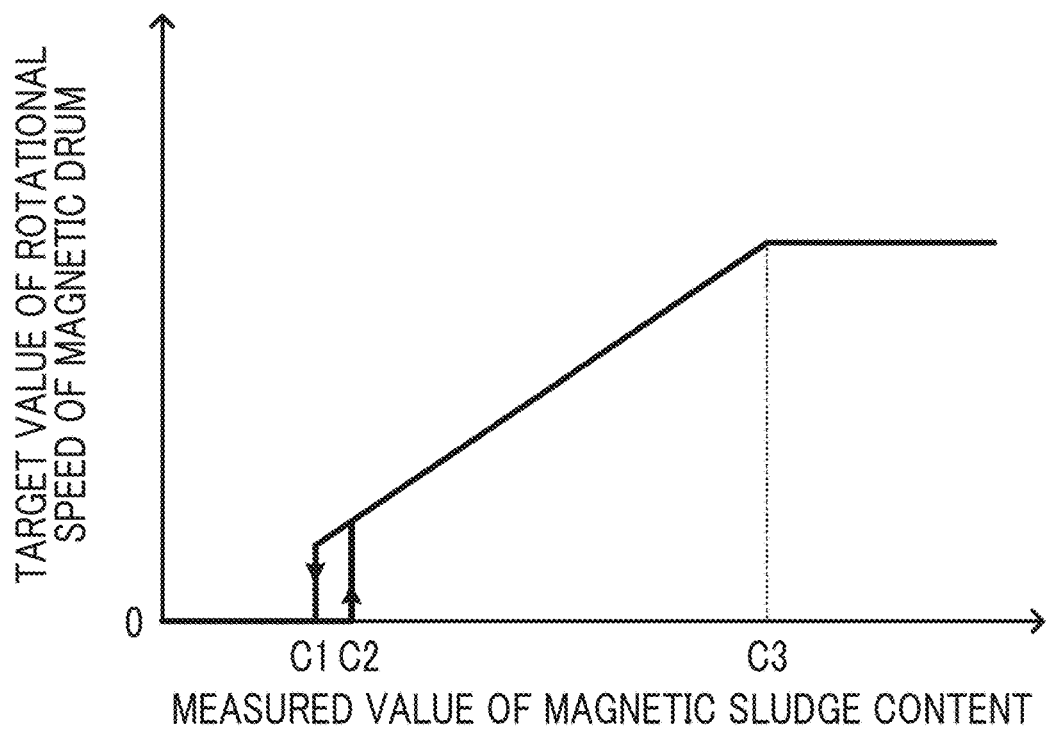
FIG. 2 is a graph illustrating an example of a relationship between a measured value of the content of a magnetic sludge and a target value of the rotational speed of a magnet drum.

FIG. 2 is a graph illustrating an example of a relationship between a measured value of the content of the magnetic sludge 31 and a target value of the rotational speed of the magnet drum 20. A horizontal axis represents the measured value of the content of the magnetic sludge 31, and a vertical axis represents the target value of the rotational speed of the magnet drum 20. When the measured value of the content of the magnetic sludge 31 is within the range from a reference lower limit value C1 to a reference upper limit value C3, the control device 50 increases the target value of the rotational speed of the magnet drum 20 as the measured value of the content of the magnetic sludge 31 rises. For example, the target value of the rotational speed of the magnet drum 20 is determined such that the thickness of the magnetic sludge 31 attracted on the outer peripheral surface of the magnet drum 20 falls within a target range, at the position where the roller 27 (FIG. 1) is in contact. The target range of the thickness of the magnetic sludge 31 is, for example, 0.5 mm or more and 1 mm or less.

When the measured value of the content of the magnetic sludge 31 becomes less than the reference lower limit value C1, the target value of the rotational speed of the magnet drum 20 is set to zero. That is, when the measured value of the content of the magnetic sludge 31 becomes less than the reference lower limit value C1, the rotation of the magnet drum 20 is stopped. When the measured value of the content of the magnetic sludge 31 becomes the rotation start threshold value C2 or more, the rotation of the magnet drum 20 is resumed. When the measured value of the content of the magnetic sludge 31 exceeds the reference upper limit value C3, the target value of the rotational speed of the magnet drum 20 is maintained at a rotational speed corresponding to the maximum allowable rotational speed of the motor 25.

Figure 3:
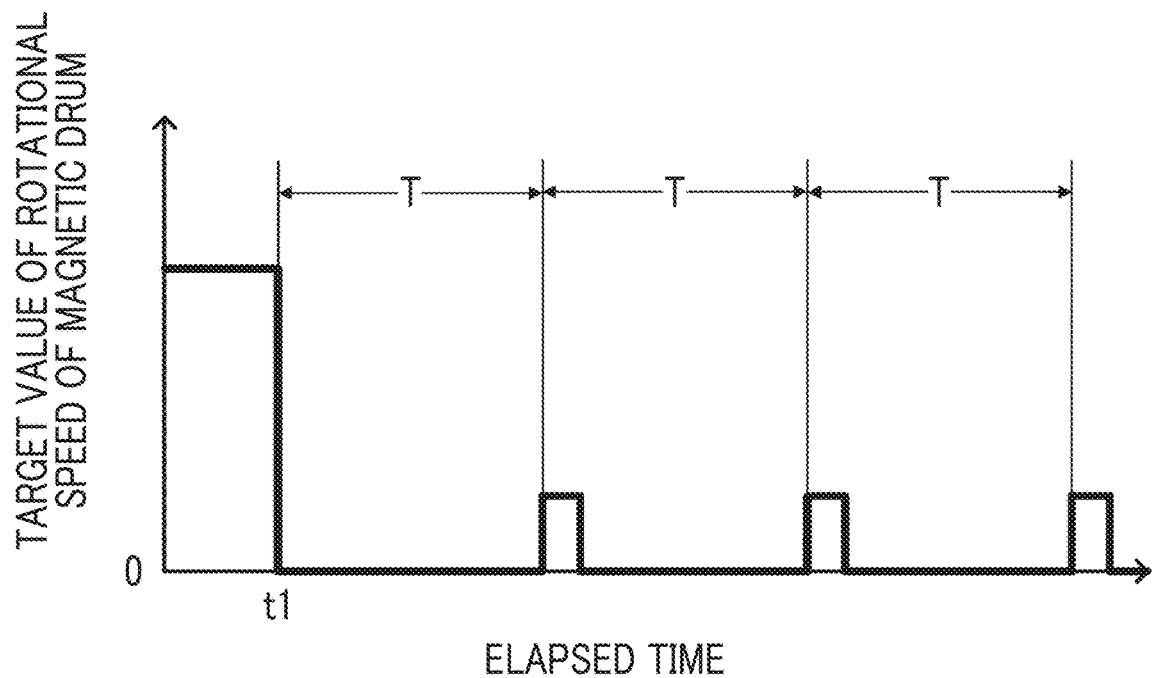
FIG. 3 is a graph illustrating time changes in the target value of the rotational speed of the magnet drum during a period in which the measured value of the content of the magnetic sludge is below a reference lower limit value.

FIG. 3 is a graph illustrating time changes in the target value of the rotational speed of the magnet drum 20 during a period in which the measured value of the content of the magnetic sludge 31 is below the reference lower limit value C1 (FIG. 2). When the measured value of the content of the magnetic sludge 31 becomes less than the reference lower limit value C1 (FIG. 2) at time t1, the rotation of the magnet drum 20 is stopped. After that, the control device 50 intermittently rotates the magnet drum 20 during the period until the measured value of the content of the magnetic sludge 31 becomes a rotation start threshold value C2 or more. For example, the magnet drum 20 is rotated at least once whenever a certain cycle T elapses.

Next, the excellent effects of the embodiment illustrated in FIGS. 1 to 3 will be described.

In a case where the magnet drum 20 is rotated at a certain speed regardless of the content of the magnetic sludge 31, the amount of the magnetic sludge 31 attracted on the outer peripheral surface of the magnet drum 20 increases when the content of the magnetic sludge 31 increases. When the layer of the magnetic sludge 31 attracted on the outer peripheral surface of the magnet drum 20 becomes thicker, a magnetic force for attracting the magnetic sludge 31 weakens. As a result, the amount of magnetic sludge 31 that is not attracted to the magnet drum 20 and is discharged from the discharge port 12 increases. That is, the removal capability of the magnetic sludge 31 decreases.

Additionally, when the layer of the magnetic sludge 31 attracted on the outer peripheral surface of the magnet drum 20 becomes thicker, the liquid component removal capability by the roller 27 (FIG. 1) is insufficient with respect to the amount of the liquid component adhering to the outer peripheral surface of the magnet drum 20. As a result, a large amount of liquid component passes through the roller 27 and reaches the scraper 26 (FIG. 1), and a large amount of liquid component is discharged together with the magnetic sludge 31.

When the layer of the magnetic sludge 31 attracted on the outer peripheral surface of the magnet drum 20 becomes thicker, an excessive load is applied to the magnet drum 20 and the roller 27. The excessive load causes a failure of a drive system such as the motor 25.

In the present embodiment, as the content of the magnetic sludge 31 is increased, the magnetic sludge 31 attracted on the outer peripheral surface of the magnet drum 20 is removed at an early stage by increasing the rotational speed of the magnet drum 20. As a result, a decrease in attraction force due to the excessive magnetic sludge 31 being attracted to the outer peripheral surface of the magnet drum 20 is suppressed. For this reason, it is possible to prevent a decrease in the removal capability of the magnetic sludge 31. Moreover, it is possible to obtain excellent effects of suppressing an increase in the liquid component discharged together with the magnetic sludge 31 and reducing the risk of failure of the drive system.

Moreover, when the content of the magnetic sludge 31 becomes less than the reference lower limit value C1 (FIG. 2), the rotation of the magnet drum 20 is stopped. Therefore, the amount of energy consumption can be suppressed. In addition, even in a case where the content of the magnetic sludge 31 is less than the reference lower limit value C1, when a very small amount of the magnetic sludge 31 is contained, the magnetic sludge 31 is gradually attracted on the outer peripheral surface of the magnet drum 20, and the layer of the magnetic sludge 31 becomes thick. In the present embodiment, since the magnet drum 20 is intermittently rotated even during the period in which the content of the magnetic sludge 31 is less than the reference lower limit value C1, it is possible to suppress a situation in which the layer of the magnetic sludge 31 attracted on the outer peripheral surface of the magnet drum 20 becomes excessively thicker.

Next, a modification example of the embodiment illustrated in FIGS. 1 to 3 will be described.

In the embodiment illustrated in FIGS. 1 to 3, the target value of the rotational speed of the magnet drum 20 is constant in a range where the magnetic sludge content exceeds the reference upper limit value C3 (FIG. 2). For this reason, a state in which the layer of the magnetic sludge attracted on the outer peripheral surface of the magnet drum 20 becomes excessively thick may occur. In the present modification example, when the magnetic sludge content exceeds the reference upper limit value C3 (FIG. 2), the pressing force of the roller 27 (FIG. 1) against the magnet drum 20 is reduced. Accordingly, an excessive increase in the load applied to the motor 25 can be suppressed. Accordingly, the risk of failure of the drive system such as the motor 25 can be further reduced.

Additionally, in the above embodiment, power is transmitted to the roller 27 (FIG. 1) by using the sprocket and the chain to forcibly rotate the roller 27. Instead of transmitting the power to the roller 27, the roller 27 may be configured to be rotated by a frictional force between the outer cylinder 21 and the roller 27.

Next, a grinding system according to another embodiment will be described with reference to FIG. 4. The grinding system according to the present embodiment includes a grinding device, and the magnetic separator according to the embodiment illustrated in FIGS. 1 to 3.

Figure 4:
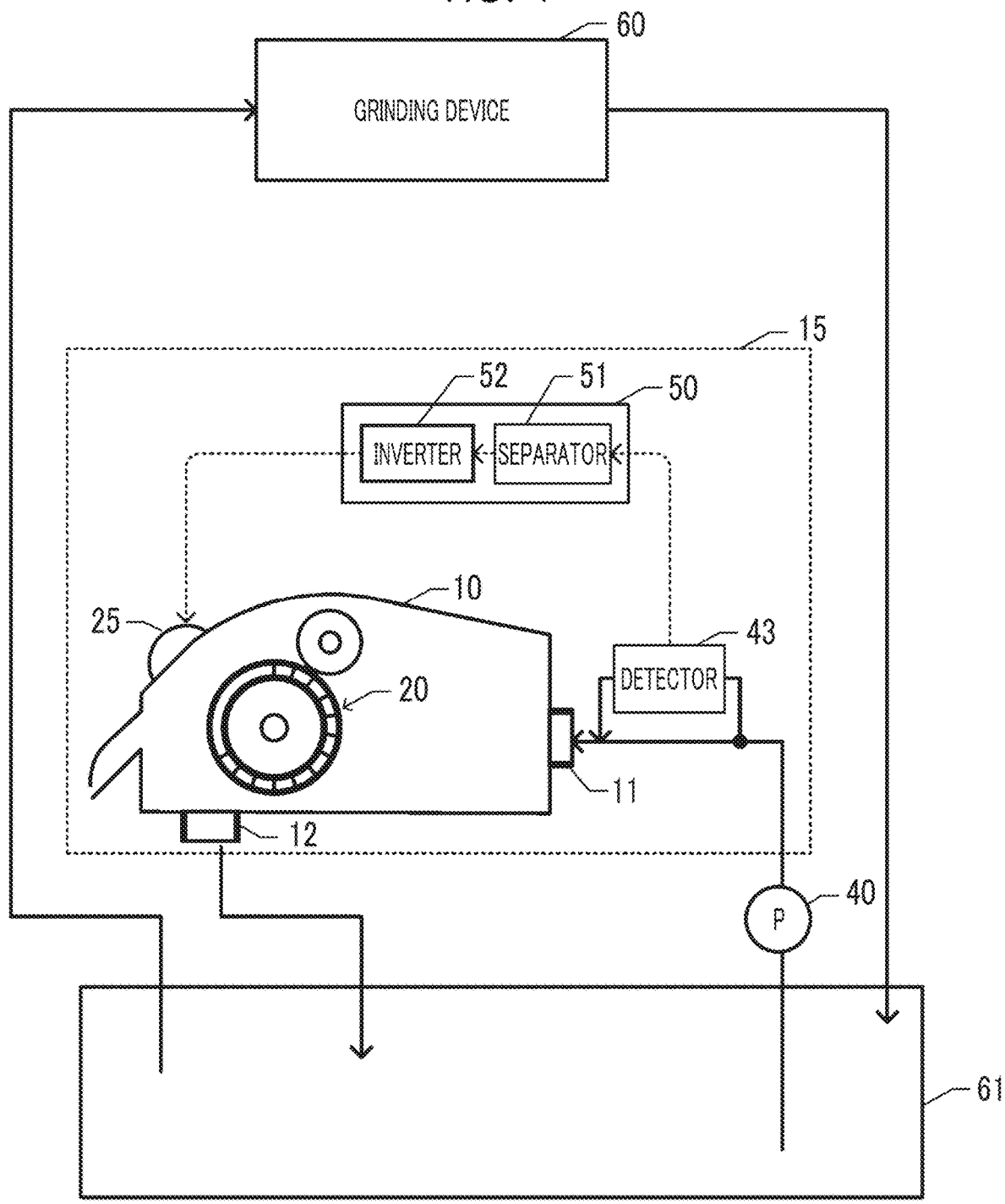
FIG. 4 is a schematic view of a grinding system according to another embodiment.

FIG. 4 is a schematic view of the grinding system according to the present embodiment. The grinding device 60 grinds a workpiece containing a magnetic material with a grindstone while supplying a coolant liquid. The coolant liquid containing the magnetic sludge discharged from the grinding device 60 is recovered in the coolant tank 61. The pump 40 sucks the coolant liquid containing the magnetic sludge from the coolant tank 61 and supplies the coolant liquid to the magnetic separator 15. This coolant liquid corresponds to the liquid to be treated supplied to the magnetic separator illustrated in FIGS. 1 to 3. The coolant liquid from which the magnetic sludge has been removed by the magnetic separator 15 is discharged from the discharge port 12 and returned to the coolant tank 61. The coolant liquid is supplied from the coolant tank 61 to the grinding device 60 and reused.

Next, the excellent effects of the present embodiment will be described.

By operating the magnetic separator 15, the magnetic sludge can be removed from the coolant liquid in the coolant tank 61. The coolant liquid from which the magnetic sludge has been removed can be supplied to the grinding device 60. In order to control the rotational speed of the magnet drum 20 (FIG. 1) depending on the magnetic sludge content of the coolant liquid suctioned by the pump 40, when the magnetic sludge content of the coolant liquid in the coolant tank 61 increases, the rotational speed of the magnet drum 20 increases, and the magnetic sludge removal capability increases. As a result, the magnetic sludge content of the coolant liquid in the coolant tank 61 can be rapidly decreased.

Next, a grinding system according to still another embodiment will be described with reference to FIG. 5. The grinding system according to the present embodiment includes a grinding device, and the magnetic separator according to the embodiment illustrated in FIGS. 1 to 3.

FIG. 5 is a schematic view of the grinding system according to the present embodiment. The coolant liquid containing the magnetic sludge discharged from the grinding device 60 flows into the inflow port 11 of the magnetic separator 15 via the pump 40. The coolant liquid discharged from the discharge port 12 is recovered in a buffer tank 62. The coolant liquid recovered in the buffer tank 62 is supplied to the grinding device 60 and reused.

Next, the excellent effects of the present embodiment will be described.

The magnetic sludge removal capability of the magnetic separator 15 can be increased or decreased on the basis of the magnetic sludge content of the coolant liquid discharged from the grinding device 60. Accordingly, it is possible to exhibit sufficient magnetic sludge removal capability and resupply the coolant liquid, from which the magnetic sludge has been sufficiently removed, to the grinding device 60.

Next, a magnetic separator according to still another embodiment will be described with reference to FIGS. 6 and 7. Hereinafter, the description of the components in common with those of the embodiment illustrated in FIGS. 1 to 3 will be omitted.

FIG. 6 is a schematic view of the magnetic separator according to the present embodiment, and the grinding device. In the present embodiment, similarly to the embodiment illustrated in FIG. 4, the coolant liquid discharged from the grinding device 60 is recovered in the coolant tank 61, and the coolant liquid in the coolant tank 61 is resupplied to the grinding device 60. In the present embodiment, a flow rate adjusting valve 44 is inserted into a flow path from the discharge port of the pump 40 to the inflow port 11 of the magnetic separator 15.

In the embodiment illustrated in FIGS. 1 to 3, the rotational speed of the motor 25 is adjusted depending on the magnetic sludge content of the coolant liquid. However, in the present embodiment, the control device 50 is adjusted depending on the magnetic sludge content of the coolant liquid, so that the flow rate adjusting valve 44 controls the flow rate of the coolant liquid flowing into the inflow port 11 of the magnetic separator 15.

FIG. 7 is a graph illustrating a relationship between a measured value of the magnetic sludge content of the coolant liquid and a target value of the flow rate of the coolant liquid. A horizontal axis represents the measured value of the magnetic sludge content, and a vertical axis represents the target value of the flow rate of the coolant liquid. The control device 50 lowers the target value of the flow rate of the coolant liquid as the measured value of the magnetic sludge content increases. For example, when the measured value of the magnetic sludge content increases from C4 to C5, the control device 50 lowers the target value of the flow rate of the coolant liquid from F2 to F1. On the contrary, when the measured value of the magnetic sludge content decreases from C5 to C4, the control device 50 increases the target value of the flow rate of the coolant liquid from F1 to F2. When the measured value of the magnetic sludge content exceeds an allowable upper limit value C6, the control device 50 sets the target value of the flow rate of the coolant liquid to zero. That is, the pump 40 is stopped.

Next, the excellent effects of the present embodiment will be described.

When the magnetic sludge content of the coolant liquid becomes excessive, as described in the embodiment illustrated in FIGS. 1 and 3, a large amount of liquid component is recovered together with the magnetic sludge, or the risk of failure of the drive system such as the motor 25 increases. In the present embodiment, when the magnetic sludge content becomes excessively large, the flow rate of the coolant liquid is lowered. Lowering the flow rate of the coolant liquid corresponds to lowering the magnetic sludge removal capability of the magnetic separator 15. For this reason, it is possible to suppress a situation in which the layer of the magnetic sludge attracted on the outer peripheral surface of the magnet drum 20 becomes excessively thick. Accordingly, it is possible to suppress discharge of a large amount of liquid component together with the magnetic sludge and reduce the risk of failure of the drive system such as the motor 25.

Next, a magnetic separator according to still another embodiment will be described with reference to FIGS. 8 and 9. Hereinafter, the description of the components in common with those of the embodiment illustrated in FIGS. 1 to 3 will be omitted.

FIG. 8 is a schematic view of the magnetic separator according to the present embodiment, and the grinding device. In the present embodiment, similarly to the embodiment illustrated in FIG. 5, the coolant liquid discharged from the grinding device 60 flows into the inflow port 11 of the magnetic separator 15 through the pump 40. In the embodiment illustrated in FIGS. 1 to 3, the measured value of the magnetic sludge content of the liquid to be treated detected by the detector 43 is input to the control device 50. On the contrary, in the present embodiment, the grinding conditions of the grinding device 60 are input to the control device 50 from an output unit 45 of the grinding device 60. The grinding conditions include, for example, the grinding depth of the grindstone into the workpiece, the movement speed of the workpiece, and the like. Since the amount of magnetic sludge generated depends on these grinding conditions, these grinding conditions can be said to be magnetic sludge containing information relating to the magnetic sludge content of the coolant liquid. Additionally, the output unit 45 has a function as a magnetic sludge containing information acquisition unit.

The control device 50 determines the target value of the rotational speed of the magnet drum 20 depending on the grinding conditions of the grinding device 60.

FIG. 9 is a graph illustrating an example of a relationship between the grinding conditions and the target value of the rotational speed of the magnet drum 20. A horizontal axis represents the product of the grinding depth of the grindstone and the movement speed of the workpiece, and a vertical axis represents the target value of the rotational speed of the magnet drum 20. The amount of magnetic sludge generated increases as the grinding depth of the grindstone increases, and the amount of magnetic sludge generated per unit time increases as the movement speed of the workpiece increases. That is, a large product of the grinding depth of the grindstone and the movement speed of the workpiece means that the magnetic sludge content of the coolant liquid increases.

When the product of the grinding depth of the grindstone and the movement speed of the workpiece is within a range of a reference upper limit value G1 or less, the control device 50 sets the target value of the rotational speed of the magnet drum 20 to R1. When the product of the grinding depth of the grindstone and the movement speed of the workpiece exceeds the reference upper limit value G1, the target value of the rotational speed of the magnet drum 20 is raised from R1 to R2. In a case where the product of the grinding depth of the grindstone and the movement speed of the workpiece is zero, that is, no grinding is performed, the rotation of the magnet drum 20 is stopped by setting the target value of the rotational speed of the magnet drum 20 to zero.

Next, the excellent effects of the present embodiment will be described.

Also in the present embodiment, similarly to the embodiment illustrated in FIGS. 1 to 3, excellent effects, such as prevention of degradation in the recovery performance of the magnetic sludge, suppression of increase in the liquid component discharged together with the magnetic sludge, and reduction in the risk of failure of the drive system can be obtained.

In the above embodiment, the drum type magnetic separator having the magnet drum has been exemplified. However, the technical idea of changing the magnetic sludge removal capability depending on the content of the magnetic sludge can also be applied a magnetic separator having another structure, for example, a conveyor type magnetic separator.

It is needless to say that the above-described respective embodiments are merely examples, and partial replacement or combination of the components illustrated in different embodiments is possible. The same operational effects by the same components of the plurality of embodiments will not be sequentially described for each embodiment. Moreover, the present invention is not limited to the above-described embodiments. For example, it will be apparent to those skilled in the art that various modifications, improvements, combinations, and the like can be made.

It should be understood that the invention is not limited to the above-described embodiment, but may be modified into various forms on the basis of the spirit of the invention. Additionally, the modifications are included in the scope of the invention.

What is claimed is:

1. A magnetic separator comprising:
   a magnet drum configured to:
      generate a magnetic force on an outer peripheral surface of the magnet drum, and
      rotate in a state in which a part of the outer peripheral surface is configured to be immersed in a flow of a liquid to be treated containing a magnetic sludge;
   a roller configured to:
      press against the outer peripheral surface of the magnet drum;
   a removing mechanism configured to:
      remove the magnetic sludge on the outer peripheral surface of the magnet drum from the outer peripheral surface of the magnet drum;
   a magnetic sludge containing information acquisition device configured to:
      acquire magnetic sludge containing information relating to a content of the magnetic sludge contained in the liquid to be treated; and
   a control device configured to:
      change a magnetic sludge removal capability of the magnet drum depending on the magnetic sludge containing information acquired by the magnetic sludge containing information acquisition device, and
      perform control such that a thickness of the magnetic sludge attracted to the outer peripheral surface of the magnet drum falls within a target range.

2. The magnetic separator according to claim 1, wherein the magnet drum includes an outer cylinder and an inner cylinder.

3. The magnetic separator according to claim 2, wherein the outer cylinder is rotatable around a central axis by a motor, and
a plurality of magnets are disposed side by side in a circumferential direction on an outer peripheral surface of the inner cylinder.

4. The magnetic separator according to claim 3, wherein the magnets are disposed such that magnetic poles having different polarities appear on a surface on an inner peripheral side thereof and a surface on an outer peripheral side thereof and S poles and N poles appear alternately in the circumferential direction.

5. The magnetic separator according to claim 1, wherein the magnetic sludge containing information acquisition device is configured to measure the content of the magnetic sludge contained in the liquid to be treated, and
the control device is configured to change the magnetic sludge removal capability of the magnet drum depending on the content of the magnetic sludge measured by the magnetic sludge containing information acquisition device.

6. The magnetic separator according to claim 5, wherein when the content of the magnetic sludge measured by the magnetic sludge containing information acquisition device increases, the control device is configured to increase a rotational speed of the magnet drum.

7. A magnetic separator comprising:
   a magnet drum configured to:
      rotate in a state in which a part of an outer peripheral surface is configured to be immersed in a flow of a liquid to be treated containing a magnetic sludge, the magnet drum is configured to generate a magnetic force on the outer peripheral surface;
   a removing mechanism configured to:
      remove the magnetic sludge on the outer peripheral surface of the magnet drum from the outer peripheral surface of the magnet drum;
   a magnetic sludge containing information acquisition device configured to:
      measure content of the magnetic sludge contained in the liquid to be treated, and
      acquire magnetic sludge containing information relating to the content of the magnetic sludge contained in the liquid to be treated; and
   a control device configured to:
      change a magnetic sludge removal capability of the magnet drum depending on the magnetic sludge containing information acquired by the magnetic sludge containing information acquisition device,
      change the magnetic sludge removal capability of the magnet drum depending on the content of the magnetic sludge measured by the magnetic sludge containing information acquisition device, and
      stop, when the content of the magnetic sludge measured by the magnetic sludge containing information acquisition device falls below a reference lower limit value, the rotation of the magnet drum.

8. The magnetic separator according to claim 7, wherein the control device is configured to intermittently rotate the magnet drum during a period in which the content of the magnetic sludge measured by the magnetic sludge containing information acquisition device is below the reference lower limit value and the rotation of the magnet drum is stopped.

9. The magnetic separator according to claim 1, further comprising:
a housing comprised of:
an inflow port into which the liquid to be treated flows,
a flow path through which the liquid to be treated flows from the inflow port, and
a discharge port out of which the liquid to be treated flows from the flow path.

10. A grinding system comprising:
the magnetic separator according to claim 9; and
a grinding device combined with the magnetic separator, wherein the grinding device is configured to:
grind a surface of a workpiece containing a magnetic material with a grindstone while supplying a coolant onto the surface, and
discharge, into the inflow port as the liquid to be treated, the coolant containing the magnetic sludge generated during the grinding, and
the magnetic sludge containing information includes grinding conditions of the grinding device.

11. The grinding system according to claim 10, further comprising:
a coolant tank; and
a pump,
wherein:
the coolant containing the magnetic sludge discharged from the grinding device is recoverable in the coolant tank,
the pump is configured to supply the coolant containing the magnetic sludge from the coolant tank to the magnetic separator via the inflow port,
the coolant from which the magnetic sludge is removed in the magnet drum is discharged from the discharge port and returned to the coolant tank, and
the coolant is supplied from the coolant tank to the grinding device and reused.

12. A grinding system comprising:
a magnetic separator;
a grinding device combined with the magnetic separator;
a buffer tank; and
a pump,
wherein the magnetic separator comprises:
a magnet drum configured to rotate in a state in which a part of an outer peripheral surface is configured to be immersed in a flow of a liquid to be treated containing a magnetic sludge, the magnet drum is configured to generate a magnetic force on the outer peripheral surface,
a removing mechanism configured to remove the magnetic sludge on the outer peripheral surface of the magnet drum from the outer peripheral surface of the magnet drum,
a magnetic sludge containing information acquisition device configured to acquire magnetic sludge containing information relating to a content of the magnetic sludge contained in the liquid to be treated,
a control device configured to change a magnetic sludge removal capability of the magnet drum depending on the magnetic sludge containing information acquired by the magnetic sludge containing information acquisition device, and
a housing,
wherein the housing is comprised of:
an inflow port into which the liquid to be treated flows,
a flow path through which the liquid to be treated flows from the inflow port, and
a discharge port out of which the liquid to be treated flows from the flow path,
wherein the grinding device is configured to:
grind a surface of a workpiece containing a magnetic material with a grindstone while supplying a coolant onto the surface, and
discharge, into the inflow port as the liquid to be treated, the coolant containing the magnetic sludge generated during the grinding,
wherein the magnetic sludge containing information includes grinding conditions of the grinding device,
wherein:
the coolant containing the magnetic sludge discharged from the grinding device flows into the inflow port via the pump,
the coolant discharged from the discharge port is recovered in the buffer tank, and
the coolant recovered in the buffer tank is supplied to the grinding device and reused.

13. The magnetic separator according to claim 1, further comprising:
a roller that is configured to:
rotate in a direction opposite to a rotational direction of the magnet drum, and press against the outer peripheral surface of the magnet drum at a position between a contact point at which the outer peripheral surface of the magnet drum and a liquid surface of the liquid to be treated come into contact with each other and a contact point at which the outer peripheral surface of the magnet drum and the removing mechanism come into contact with each other.

14. A magnetic sludge removal method used for the magnetic separator according to claim 1 comprising:
acquiring, by the magnetic sludge containing information acquisition deice, the magnetic sludge containing information related to the content of the magnetic sludge contained in the liquid to be treated flowing into the magnetic separator; and
changing, by the control device, the magnetic sludge removal capability of the magnetic separator depending on the acquired magnetic sludge containing information.

15. The magnetic sludge removal method according to claim 14, the method further comprising:
immersing a part of the magnet drum in the flow of the liquid to be treated;
generating a magnetic force on the outer peripheral surface; and
changing a rotational speed of the magnet drum thereby changing a magnetic sludge removal capability.

* * * * *